ately *available with diffi-*
United States Patent Office 3,352,885
Patented Nov. 14, 1967

3,352,885
PROCESS FOR THE PRODUCTION OF 7-AMINO-3-PHENYL-COUMARINE COMPOUNDS
Carl-Wolfgang Schellhammer, Opladen, Karl-Walter Müller, Leverkusen, and Roderich Raue, Leverkusen-Wiesdorf, Germany, assignors to Farbenfabriken Bayer Aktiengesellschaft, Leverkusen, Germany, a German corporation
No Drawing. Filed Mar. 2, 1965, Ser. No. 436,669
Claims priority, application Germany, Mar. 7, 1964, F 42,238
6 Claims. (Cl. 260—343.2)

The present invention concerns a process for the production of 7-amino-3-phenyl-coumarine compounds; the process consists in that salicylidene-anilines of the formula

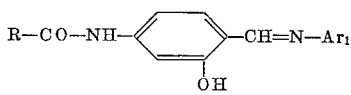

wherein

R represents a lower alkyl radical, preferably methyl, and Ar₁ represents an aromatic radical, preferably phenyl are heated, conveniently at about 130 to 180° C. for 12 to 24 hours, with phenylacetic acid, which may optionally be substituted on the ring, in the presence of water removing agents, conveniently of acetic anhydride, and in the presence of alkali metal salts of carboxylic acids, conveniently of sodium acetate or sodium phenylacetate, whereupon the acyl radical is eliminated from the resultant 7-acylamino-3-phenyl-coumarine compounds of the formula

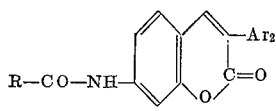

wherein

R has the above specified significance and
Ar₂ denotes an optionally substituted phenyl radical, by a method known per se, for instance with mineral acids.

The salicylidene-anilines which serve as the starting materials can for instance be obtained by reducing a 4-acylamino-salicylic acid, for instance 4-acetylamino-salicylic acid, with sodium amalgam in the presence of an aromatic amine such as aniline or p-toluidine and in the presence of the boric acid and/or sodium chloride, for example in accordance with the procedure of Goldberg and Theobald, Journ. Chem. Soc. 1954, page 2641 or in accordance with the procedure of Ichibagase, Chemical Abstracts 50 (1956), 10 715.

Ring substituted phenylacetic acids which can be used instead of phenylacetic acid in the process of the invention are for instance tolylacetic acid and chloro-, methoxy-, acetylamino-, nitro-, methylsulphonyl-, sulphonamido or trimethylammonium-phenylacetic acid.

The process according to the invention enables the preparation of the 7-amino-3-phenyl-coumarine compounds required for the production of optical brighteners from the 7-amino-3-phenyl-coumarine series to be carried out by a simpler method than is possible by the procedure employed up till now wherein 4-acetylamino-2-methoxy-benzaldehyde which is only available with difficulty is reacted with benzyl cyanides optionally substituted on the ring whereupon the resultant α-phenyl-β-(2-methoxy-4-acetylamino-phenyl)-acrylonitrile is cyclised with the fission of the ether bond to form 7-acetylamino-3-phenyl-coumarine.

The following examples serve to illustrate the invention without, however, limiting its scope.

Example 1

19 g. of (4-acetylamino-salicylidene)-p-toluidine are introduced at 60° C. into a mixture of 12.6 g. of phenylacetic acid, 45 g. of acetic anhydride and 3.7 g. of powdered sodium hydroxide. The reaction mixture is then heated to boiling under reflux for 20 hours, whilst stirring. An internal temperature of 148–150° C. is achieved during this operation. 35 cc. of conc. hydrochloric acid are thereafter added dropwise at 70–100° C. and the mixture is heated at 105° C. for another 2 hours. The reaction mixture is then cooled, and the separated crystals of the resultant 7-amino-3-phenyl-coumarine hydrochloride are filtered off with suction, washed with 80% acetic acid and thereafter stirred with 1.5 litres of water for 4–6 hours. The yellow crystals are filtered off with suction and dried at 90° C. 12 g. of 7-amino-3-phenyl-coumarine of melting point 201–204° C. are obtained. Yield: 71.5% of the quantitative yield.

Example 2

A mixture of 238 g. of (4-acetylamino-salycilidene)-aniline, 159 g. of phenylacetic acid, 480 g. of acetic anhydride and 92 g. of sodium acetate is heated to boiling under reflux for 20 hours whilst stirring. The reaction mixture is then cooled to 100° C., 400 cc. of conc. hydrochloric acid are added dropwise at 70–100° C. and the mixture is heated to boiling under reflux for 4 hours whilst stirring. The reaction mixture is thereafter cooled and the separated 7-amino-3-phenyl-coumarine hydrochloride is filtered off with suction, washed with a mixture of 80 cc. of glacial acetic acid and 20 g. of ice, and suspended in 4.5 l. of water. The resultant suspension is then adjusted to a pH value of 8 with ammonium hydroxide solution, and the separated crystals are filtered off with suction and washed with water. 154 g. of 7-amino-3-phenyl-coumarine of melting point 200–201° C. are obtained after drying at 110° C. Yield: 64.4% of the quantitative yield.

7-amino-3-p-tolyl-coumarine of melting point 223–224° C., 7-amino-3-p-methoxy-phenyl-coumarine of melting point 253–255° C., 7-aminno-3-p-chlorophenyl-coumarine of melting point 260–261° C. and 7-amino-3-p-methyl-mercapto-phenyl-coumarine of melting point 276–278° C. can be prepared by using p-tolylacetic acid, p-methoxy-phenylacetic acid, p-chlorophenylacetic acid or p-methylmercaptophenylacetic acid instead of phenylacetic acid in an analogous manner.

We claim:
1. A process for producing 7-amino-3-phenyl-coumarine compounds comprising heating a compound of the formula

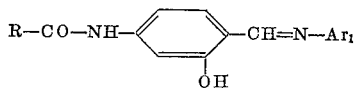

wherein R is lower alkyl and Ar₁ is an aromatic radical with phenylacetic acid or the corresponding substituted compound having as a ring substituent at least one member selected from the group consisting of alkyl, chloro, methoxy, acetylamino, nitro, methylsulfonyl, sulfonamide and trimethylammonium-phenyl acetic acid in the presence of a water-removing agent and alkali metal salts of carboxylic acids to obtain a compound of the formula

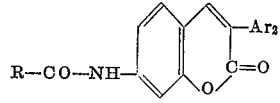

wherein Ar₂ denotes a phenyl radical, removing the acyl moiety and recovering the resulting product.
2. The process of claim 1 wherein the water removing agent is acetic anhydride.

3. The process of claim 1 wherein the alkali metal salt is a member selected from the group consisting of sodium acetate and sodium phenylacetate.

4. The process of claim 1 wherein the reaction is effected at a temperature of about 130° C.–180° C.

5. The process of claim 4 wherein about 19 grams (4-acetylamino-salicylidene)-p-toluidine are admixed with about 13 grams of phenyl-acetic acid and about 4 grams of sodium hydroxide in the presence of a water-removing amount of acetic anhydride, heating to boiling, and recovering the resulting coumarine product as the acid salt.

6. The process of claim 4 wherein about 238 grams of (4-acetylamino-salicylidene)-aniline are admixed with about 159 grams of phenylacetic acid and about 92 grams of sodium acetate in the presence of a water-removing amount of acetic anhydride, heating to boiling and recovering the resulting coumarine product as the acid salt.

References Cited

UNITED STATES PATENTS

| | | | |
|---|---|---|---|
| 2,680,747 | 6/1954 | Williams et al. | 260—343.2 |
| 2,881,186 | 4/1959 | Hausermann | 260—343.2 |

JOHN D. RANDOLPH, *Primary Examiner.*

J. PATTEN, *Assistant Examiner.*